(12) United States Patent
Parlow et al.

(10) Patent No.: US 10,738,925 B2
(45) Date of Patent: Aug. 11, 2020

(54) DIESEL FUEL CROSS-DROP PREVENTION KIT

(71) Applicants: John Paul Parlow, St. Louis, MO (US); Donald Gerard Scott, Oakville, MO (US)

(72) Inventors: John Paul Parlow, St. Louis, MO (US); Donald Gerard Scott, Oakville, MO (US)

( * ) Notice: Subject to any disclaimer, the term of this patent is extended or adjusted under 35 U.S.C. 154(b) by 72 days.

(21) Appl. No.: 16/177,168

(22) Filed: Oct. 31, 2018

(65) Prior Publication Data

US 2019/0128455 A1    May 2, 2019

Related U.S. Application Data

(60) Provisional application No. 62/579,332, filed on Oct. 31, 2017.

(51) Int. Cl.

| *F16L 37/14* | (2006.01) |
|---|---|
| *F16L 35/00* | (2006.01) |
| *B67D 7/32* | (2010.01) |
| *F16L 37/138* | (2006.01) |
| *F16L 25/08* | (2006.01) |
| *F16L 37/18* | (2006.01) |
| *F16L 37/12* | (2006.01) |

(52) U.S. Cl.
CPC ............... *F16L 35/00* (2013.01); *B67D 7/32* (2013.01); *F16L 25/08* (2013.01); *F16L 37/138* (2013.01); *F16L 37/14* (2013.01); *F16L 37/18* (2013.01); *F16L 37/1235* (2013.01); *F16L 2201/10* (2013.01); *F16L 2201/20* (2013.01)

(58) Field of Classification Search
CPC . F16L 35/00; F16L 25/08; F16L 25/06; F16L 37/14; F16L 37/18; F16L 43/02; F16L 43/00; B67D 7/32
USPC .................................................... 285/330, 27
See application file for complete search history.

(56) References Cited

U.S. PATENT DOCUMENTS

| 3,383,123 A * | 5/1968 | Murray ................... F16L 37/18 285/83 |
|---|---|---|
| 6,298,876 B1 * | 10/2001 | Bogdonoff .............. F16L 37/18 137/614.04 |
| 2014/0183860 A1 * | 7/2014 | Stead ...................... F16L 37/18 285/330 |

* cited by examiner

*Primary Examiner* — Aaron M Dunwoody

(57) ABSTRACT

A diesel fuel cross-drop prevention kit that provides a multitude of couplings and fittings designed only for a single type of fuel. The kit includes a drop-elbow coupler, a storage-tank inlet tube, a primary key slot, a primary key protrusion, a retractable pull pin, a hose, a gravity-drop tube fitting, a secondary key slot, and a secondary key protrusion. The primary key slot traverses into an internal surface of the drop-elbow coupler. The primary key protrusion is externally and laterally connected to the storage-tank inlet tube. The storage-tank inlet tube is positioned within the drop-elbow coupler with the primary key protrusion being positioned within the primary key slot. The secondary key slot traverses into a first female coupler tube of the hose. The secondary key protrusion is externally connected to the gravity-drop tube fitting. This allows the first female coupler tube to fit over the gravity-drop tube fitting.

7 Claims, 5 Drawing Sheets

DIESEL FUEL CROSS-DROP PREVENTION KIT

The current application claims a priority to the U.S. Provisional Patent application Ser. No. 62/579,332 filed on Oct. 31, 2017.

FIELD OF THE INVENTION

The present invention relates generally to fuel delivery systems. More specifically, the present invention is a fuel delivery kit used by fuel tankers to transfer fuel to storage tanks of service stations. The present invention is a multitude of hose fittings that are designed to interlock and couple only with each other, thus reducing the chances for fuel cross-contamination and fuel cross-dropping.

BACKGROUND OF THE INVENTION

Currently both diesel fuel and gasoline fuel are delivered to service stations and transferred from the tanker to the storage tanks using one common or universal hose delivery system. The hose, the tanker connection, and the storage tank assembly are identical for all types of fuel—no differentiation. This commonality of parts creates a potential problem of cross-dropping, industry term for dumping the wrong fuel into the wrong storage tank. The only safety device is the delivery driver's memory. The present invention provides a hose, fittings, and tanker connections kit that is designed to prevent human error and, therefore, cross-dropping.

At the time that fuel is pumped into the carrying tanker, the driver installs an outlet fitting of the present invention on the chamber or chambers that contain diesel fuel, thus, identifying the contents. When the delivery is made to the service station, the tankers chambers with the outlet fitting of the present invention are easily recognizable by the driver. The outlet fitting of the present invention, along with the color coded supply hose, will only fit an inlet fitting of the present invention at the stations diesel holding tank. The special fitting design of the present invention will not allow diesel fuel to be dumped into any other tank—only the diesel storage tank with the inlet fitting of the present invention. The uniqueness of the design is that both mating parts incorporate a slot (groove) on one part and a pin, set of pins or an extruding bump on the mating part. The slot has to match the pin in order for both parts to mate or seal.

DETAIL DESCRIPTIONS OF THE INVENTION

All illustrations of the drawings are for the purpose of describing selected versions of the present invention and are not intended to limit the scope of the present invention.

The present invention generally relates to fuel delivery systems used by fuel tankers to transfer fuel to storage tanks of a service station. Specifically, the present invention is designed for transferring diesel fuel from a tanker truck into a diesel storage tank. The present invention is designed to prevent cross-dropping, industry term for dumping the wrong fuel into the wrong storage tank. For simplicity purposes, the present invention is disclosed in relation to diesel fuel as mixing or cross-dropping in between diesel and gasoline results in high cost loss. Although, the present invention may be implemented/used for other types of fuels, fluids, and fields of service.

Figure 1:
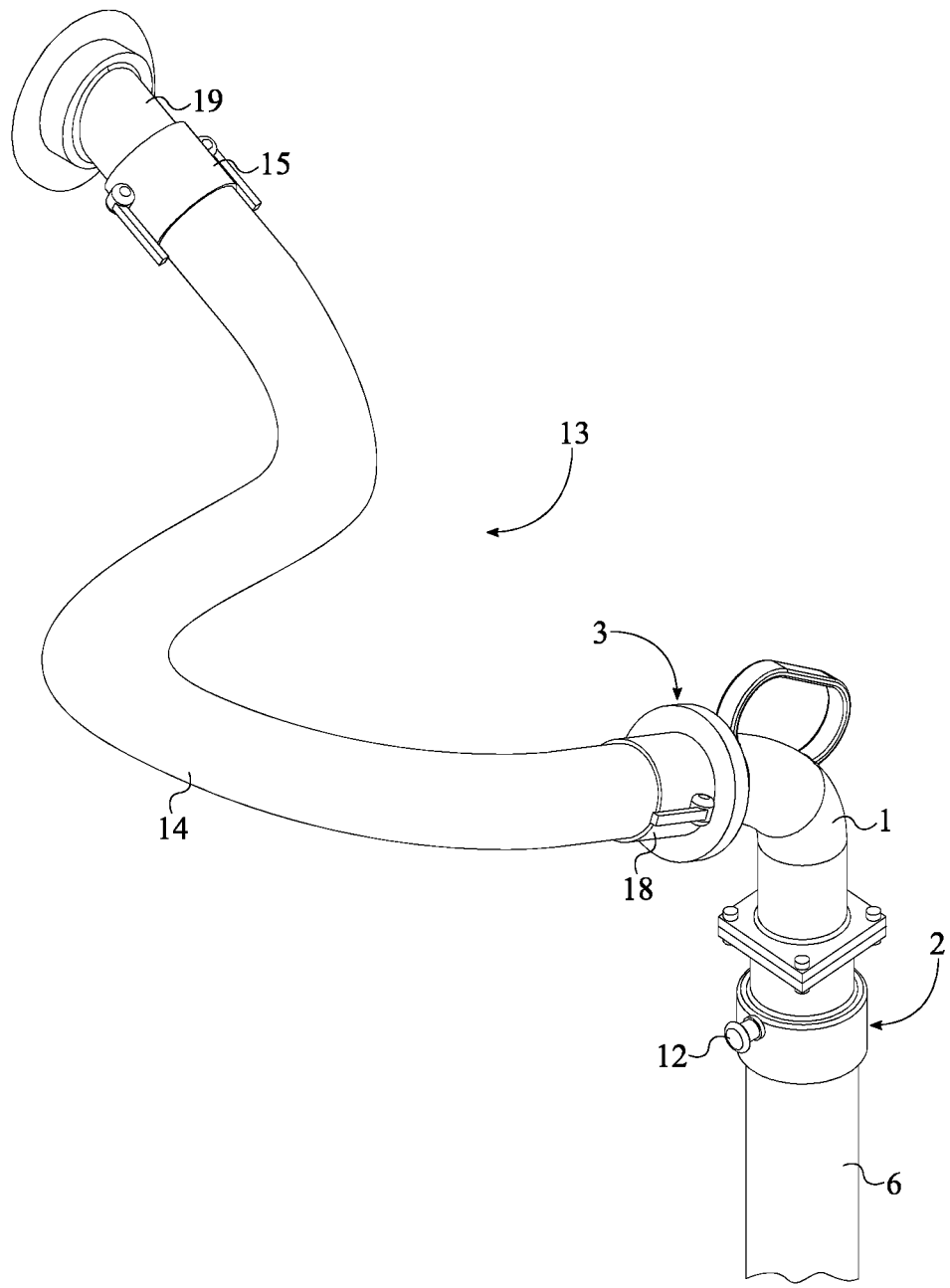
FIG. 1 is a perspective view of the present invention.
Figure 2:
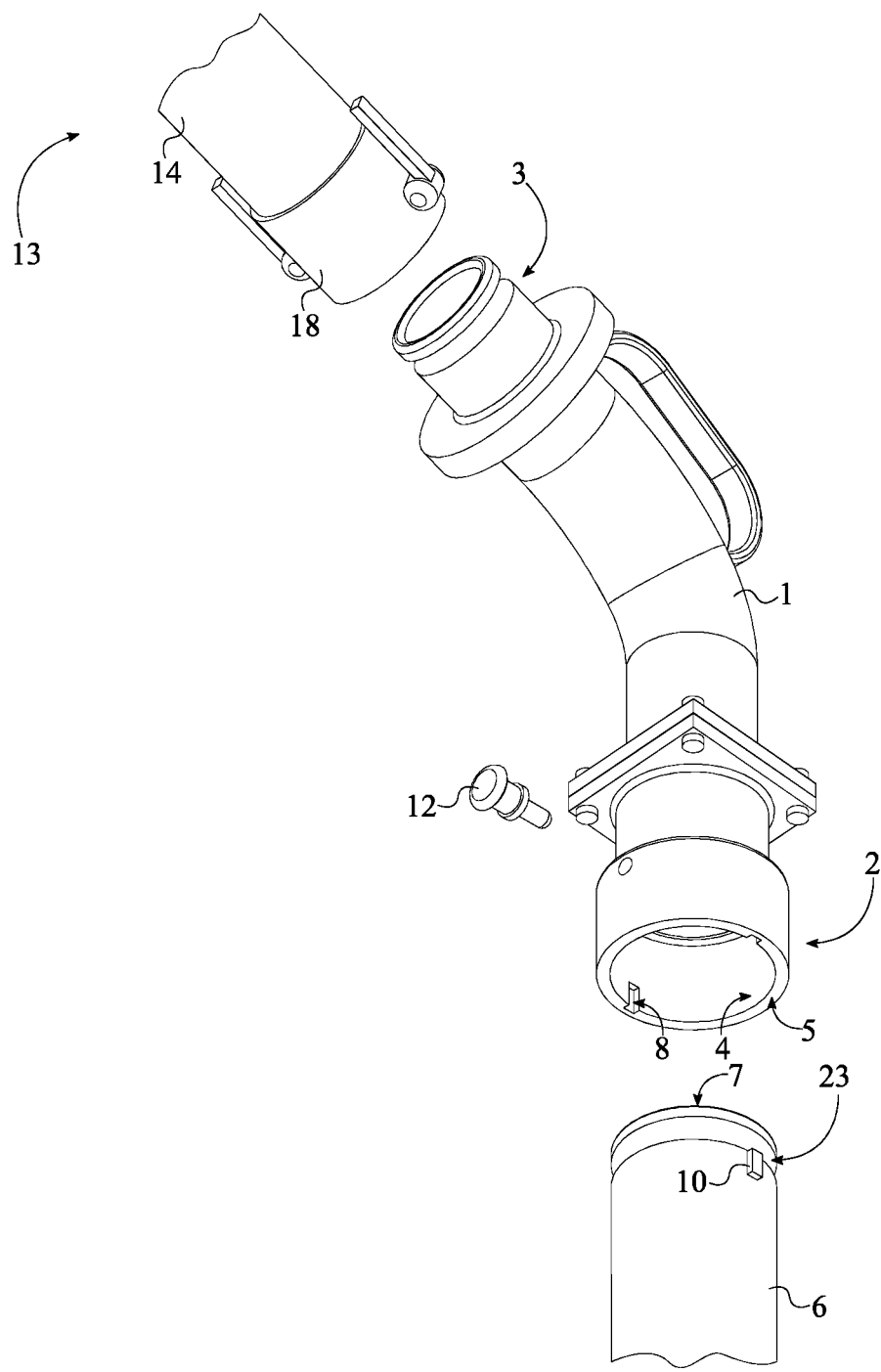
FIG. 2 is an exploded perspective view of a drop-elbow coupler, a hose, and a storage-tank inlet tube.

In general, the present invention includes components necessary to transfer fuel from a tanker truck into storage tanks of a service station, such as a gas station. Referring to FIG. 1 and FIG. 2, the present invention comprises a gravity-drop tube fitting 19, a hose 13, a drop-elbow coupler 1, a storage-tank inlet tube 6, an at least one primary key slot 8, an at least one primary key protrusion 10, a hose 13, an at least one secondary key slot 21, and an at least one secondary key protrusion 22. The gravity-drop coupler 1 attaches to a diesel outlet of the tanker truck to serve as a coupling point for the hose 13. The hose 13 attaches in between the gravity-drop coupler 1 and the drop-elbow coupler 1 to carry fuel in between. The drop-elbow coupler 1 attaches to the storage-tank inlet tube 6 to put the gravity-drop coupler 1, the hose 13, and the storage-tank inlet tube 6 in fluid communication with each other. The storage-tank inlet tube 6 receives diesel fuel from the hose 13 through the drop-elbow coupler 1 and feeds said fuel into the storage tank designated for diesel storage and redistribution. The primary key protrusion 10, the primary key slot 8, and the retractable pull pin 12 make up a primary interlocking mechanism that is integrated in between the drop-elbow coupler 1 and the storage-tank inlet tube 6. The primary interlocking mechanism ensures that the drop-elbow coupler 1 and the storage-tank inlet tube 6 of the present invention are only able to attach to each other while standard designed fittings do not fit. The secondary key protrusion 22 and the secondary key slot 21 make up a secondary interlocking mechanism that is integrated in between the hose 13 and the gravity-drop tube fitting 19. The secondary interlocking mechanism ensures that only the hose 13 of the present invention, designated for diesel fuel, is capable of attaching to the gravity-drop tube fitting 19. In general, the primary interlocking mechanism and the secondary interlocking mechanism prevent standard fuel fittings, fuel hoses, and fuel couplings from attaching to any components of the present invention.

Figure 3:
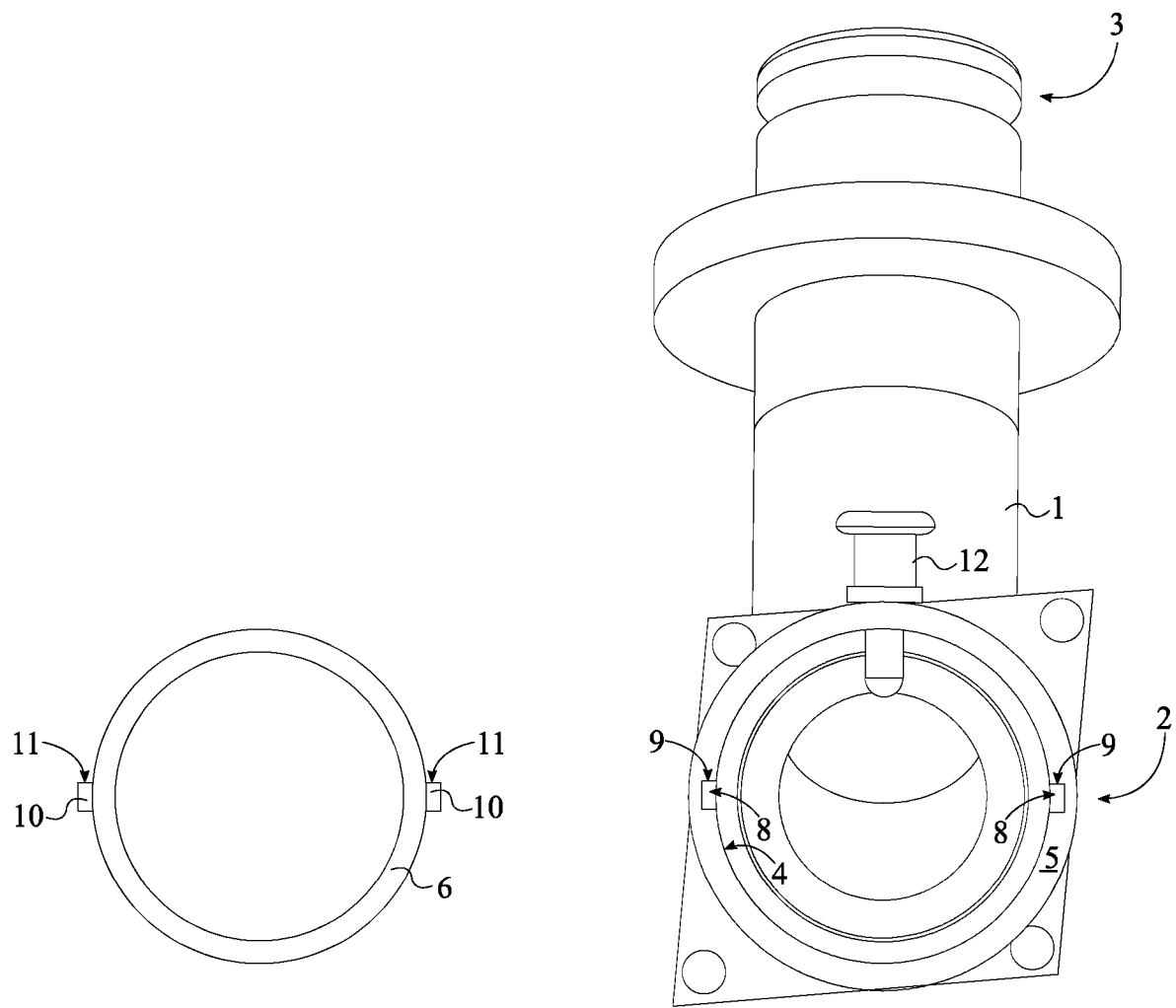
FIG. 3 is a bottom pan view of the drop-elbow coupler and the storage-tank inlet tube.

Referring to FIG. 3, the drop-elbow coupler 1 is an elongated and bent tube used as intermediate coupling element between the hose 13 and the storage-tank inlet tube 6. Specifically, the drop-elbow coupler 1 comprises a male inlet end 3 to receive the hose 13 and a female outlet end 2 to attach to the storage-tank inlet tube 6. The drop-elbow coupler 1 may also include standard manual or automatic locking mechanisms used in the industry to ensure an air-tight junction is created in between the drop-elbow coupler 1 and the storage-tank inlet tube 6. The primary interlocking mechanism is integrated in between the drop-elbow coupler 1 and the storage-tank inlet tube 6. Specifically, the primary key slot 8 is integrated into the drop-elbow coupler 1 and the primary key protrusion 10 is integrated into the storage-tank inlet tube 6. The primary key slot 8 is positioned adjacent to the female outlet end 2 and laterally traverses into the drop-elbow coupler 1 from an internal surface 4 of the drop-elbow coupler 1. Additionally, the primary key slot 8 traverses into the drop-elbow coupler 1 from an outlet rim 5 of the drop-elbow coupler 1 such that the primary key protrusion 10 may slide within the primary key slot 8; wherein the outlet rim 5 of the drop-elbow coupler 1 is the rim at the female outlet end 2 of the drop-elbow coupler 1. The primary key protrusion 10 is designed to complimentary fit within the primary key slot 8. The primary key protrusion 10 is externally positioned to the storage-tank inlet tube 6 and is laterally connected to the storage-tank inlet tube 6. The primary key protrusion 10 requires that any coupling or fitting attached to the storage-tank inlet tube 6 must have the primary key slot 8, otherwise said coupling or fitting will not fit over the storage-tank inlet tube 6 due to the obstruction created by the primary key protrusion 10. When the drop-elbow coupler 1 is positioned over the storage-tank inlet tube 6, the storage-tank inlet tube 6 is positioned coincident and within the female outlet end 2 with the primary key protrusion 10 being positioned within the primary key slot 8. In one embodiment of the present invention, the primary key slot 8 laterally traverses through the drop-elbow coupler 1 such that a larger primary key protrusion 10 may be implemented for additional structural support.

The retractable pull pin 12 is a peg, bolt, or other similar protrusion that prevents the drop-elbow coupler 1 from being attached to standard storage tanks or the storage-tank inlet tube 6 without removal or retraction of the retractable pull pin 12. The retractable pull pin 12 may be positioned into an extended configuration and a retracted configuration. The extended configuration is designed for when the present invention is not being used. The extended configuration is designed for when the present invention is being used, i.e. the storage-tank inlet tube 6 is coupled to the drop-elbow coupler 1. The retractable pull pin 12 is positioned offset from the female outlet end 2, along the drop-elbow coupler 1. Additionally, the retractable pull pin 12 is laterally integrated into the drop-elbow coupler 1. The retractable pull pin 12 is oriented perpendicular to the tubular body 14 of the drop-elbow coupler 1 and extends into an interior space of the drop-elbow coupler 1. The preferred retractable pull pin 12 is a spring loaded pin that includes a handle that acts as a grasping element for the user and the actuation mechanism for the retractable pill pin 12. The retractable pull pin 12 acts as an obstruction within the drop-elbow coupler 1 for any fitting unless the retractable pull pin 12 is positioned into the retracted configuration. Thus, if the service personnel attempts to place the drop-elbow coupler 1 over a standard storage tank, the inlet tube of the standard storage tank will press against the retractable pull pin 12, thus preventing an air-tight seal from forming in between the two. Additionally, the retractable pill pin 12 will prevent the drop-elbow coupler 1 from being attached to the storage-tank inlet tube 6 unless positioned into the retracted configuration. As such, the retractable pull pin 12 acts as visual and mechanical reminder that the drop-elbow coupler 1 is designated only for diesel fuel.

Figure 4:
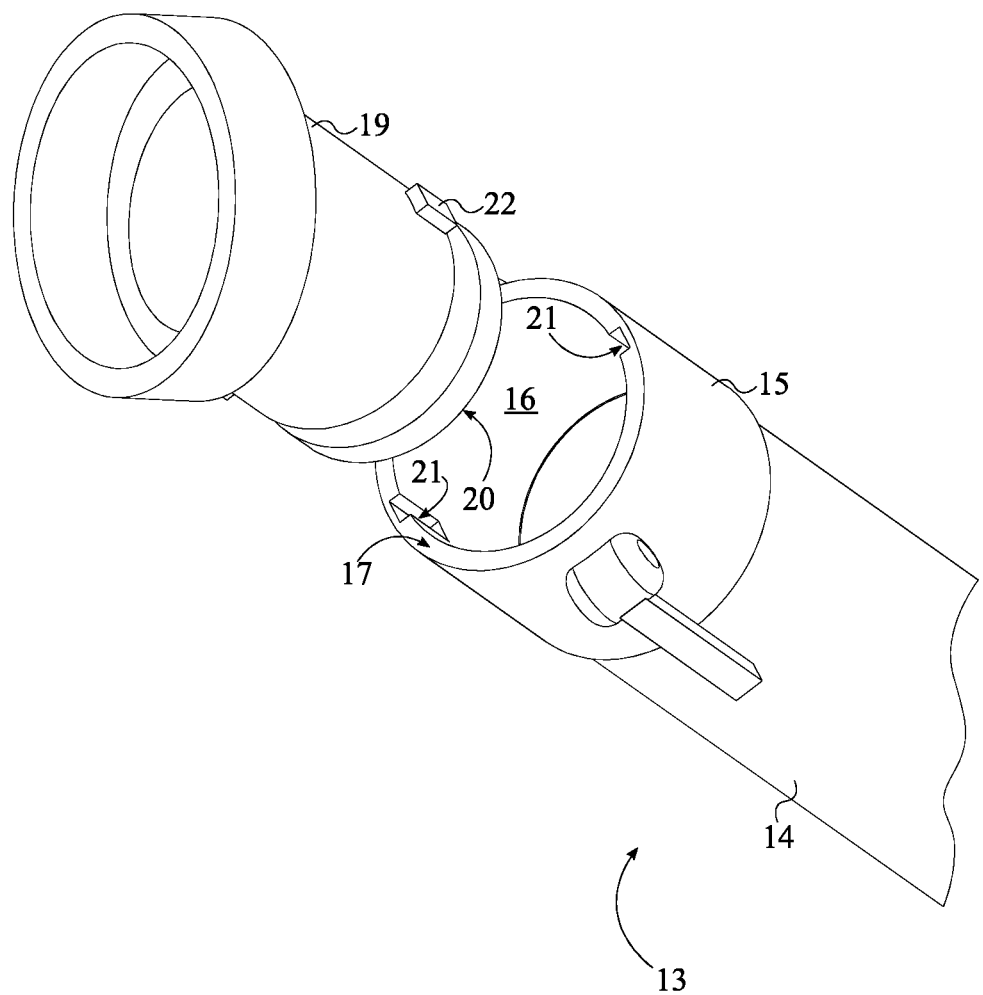
FIG. 4 is an exploded perspective view of the hose and a gravity-drop tube fitting.

Referring to FIG. 4, the gravity-drop tube fitting 19 is attached to a diesel tank outlet of the tanker track and is thus mounted offset to the drop-elbow coupler 1. The gravity-drop tube fitting 19 is coupled to the drop-elbow coupler 1 through the hose 13. The hose 13 is of standard design. The hose 13 comprises a tubular body 14, a first female coupler tube 15, and a second female coupler tube 18. The first female coupler tube 15 attaches to the gravity-drop tube fitting 19 while the second female coupler tube 18 attaches to the drop-elbow coupler 1. For this, the first female coupler tube 15 is terminally connected to the tubular body 14. Similarly, the second female coupler tube 18 is terminally connected to the tubular body 14, opposite to the first female coupler tube 15. The secondary key protrusion 22 and the secondary key slot 21 make up a secondary interlocking mechanism that couples the hose 13 to the gravity-drop tube fitting 19. Specifically, the secondary key protrusion 22 is positioned external and adjacent to the gravity-drop tube fitting 19. Additionally, the secondary key protrusion 22 is laterally connected to the gravity-drop tube fitting 19, adjacent to an outlet rim 20 of the gravity-drop tube fitting 19. This ensures that fittings and hoses not designated for diesel will not be able to attach to the gravity-drop tube fitting 19. Complimentary to the secondary key protrusion 22, the secondary key slot 21 laterally traverses into the first female coupler tube 15 from an internal surface 16 of the first female coupler tube 15. Additionally, the secondary key slot 21 traverses into an inlet rim 17 of the first female coupler tube 15, opposite the tubular body 14. The secondary key protrusion 22 and the secondary key slot 21 are sized complimentary to each other such that the secondary key protrusion 22 is capable of fitting within and interlocking with the secondary key slot 21. When the hose 13 is coupled to the gravity-drop tube fitting 19, the gravity-drop tube fitting 19 is positioned within the first female coupler tube 15 such that the secondary key protrusion 22 is positioned within the secondary key slot 21. On the other end of the hose 13, the male inlet end 3 of the drop-elbow coupler 1 is positioned within the second female coupler tube 18. Resultantly, this configures the hose 13, the gravity-drop tube fitting 19, the drop-elbow coupler 1, and the storage-tank inlet tube 6 in fluid communication with each other, allowing diesel fuel to flow from the trucker tank into the storage tank.

Figure 5:
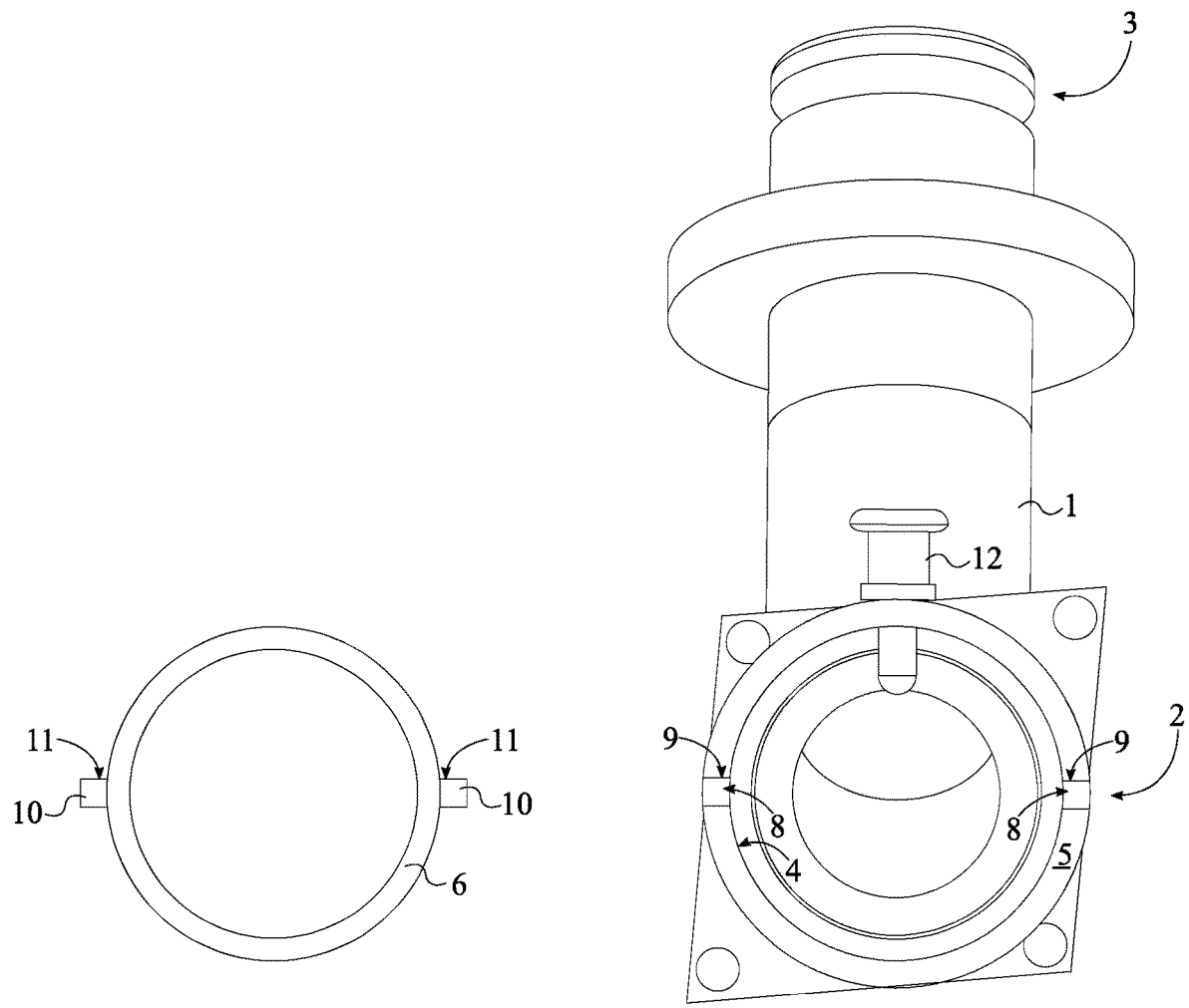
FIG. 5 is a bottom pan view of an alternative design for the drop-elbow coupler and the storage-tank inlet tube.

Referring to FIG. 3 and FIG. 5, it is preferred that a cross-section 9 of the primary key slot 8 and a cross-section 11 of the primary key protrusion 10 are each a rectangular profile, although alternative profiles and geometries may also be used. Additionally, it is preferred that the sizing of the primary key protrusion 10, and hence the thickness of the primary key slot 8, is relatively large to a diameter of the storage-tank inlet tube 6 so as to physically support the weight of the drop-elbow coupler 1. Similarly, it is preferred that a cross-section of the secondary key slot 21 and a cross-section of the secondary key protrusion 22 are each a rectangular profile, although alternative profiles and geometries may also be used.

In one embodiment of the present invention, the at least one primary key slot 8 comprises a plurality of primary key slots 8, and the at least one primary key protrusion 10 comprises a plurality of primary key protrusions 10. This provides additional structural support such that the storage-tank inlet tube 6 is capable of supporting the drop-elbow coupler 1 during operations. The plurality of primary key slots 8 is radially distributed about the drop-elbow coupler 1 for symmetrical support. Similarly, the plurality of primary key protrusions 10 is radially distributed about the storage-tank inlet tube 6. When the drop-elbow coupler 1 is positioned over the storage-tank inlet tube 6, each within the plurality of primary key protrusions 10 is positioned within a corresponding slot from the plurality of primary key slots 8. The number within the plurality of primary key slots 8 and the number within the plurality of primary key protrusions 10 is subject to change to meet the needs and requirements of the use and weight of the drop-elbow coupler 1.

Similarly, in one embodiment of the present invention, the at least one secondary key slot 21 may comprise a plurality of secondary key slots and the secondary key protrusion may comprise a plurality of secondary key protrusions; wherein the each from the plurality of secondary key protrusions is associated with a corresponding slot from the plurality of secondary key slots. The plurality of secondary key slots is radially distributed about the first female coupler tube 15. Similarly, the plurality of secondary key protrusions is radially distributed about the gravity-drop tube fitting 19. The number within the plurality of secondary key slots and the number within the secondary key protrusions is subject to change to meet the needs and preferences of the user.

In the preferred embodiment, the present invention further comprises a sealing annular cavity 23. The sealing annular cavity 23 provides a means for sealing the junction in between the storage-tank inlet tube 6 and the drop-elbow coupler 1. The sealing annular cavity 23 is coincidentally positioned with the storage-tank inlet tube 6 and is positioned offset to an inlet rim 7 of the storage-tank inlet tube 6. Additionally, the sealing annular cavity 23 laterally traverses into the storage-tank inlet tube 6. To ensure an air tight seal, the primary key protrusion 10 is positioned adjacent to the sealing annular cavity 23, opposite the inlet rim 7 of the storage-tank inlet tube 6. As a result, when the storage-tank inlet tube 6 is positioned within the drop-elbow coupler 1, the sealing cavity is positioned within the female outlet end 2.

To further ensure that cross-dropping does not occur, the hose 13, the gravity-drop tube fitting 19, the drop-elbow coupler 1, and the storage-tank inlet tube 6 are each externally colored green, although any color or pattern may be used.

Additionally, the present invention further comprises a plurality of caps and seals necessary to close off the gravity-drop tube fitting 19 and the storage-tank inlet tube 6 when the present invention is not being used. Each of the plurality of caps and seals additionally include an at least one tertiary key slot designed to compliment the primary key protrusion 10 and or the second key protrusion. Type of caps and seals include a drop adapter dust cap and a top seal cap. Furthermore, it is preferred that the second female coupler tube 18 is slotted, identical to the first female coupler tube 15, such that personnel may use either side of the hose 13.

Although the invention has been explained in relation to its preferred embodiment, it is to be understood that many other possible modifications and variations can be made without departing from the spirit and scope of the invention.

What is claimed is:
1. A diesel fuel cross-drop prevention kit comprising:
 a drop-elbow coupler;
 a storage-tank inlet tube;
 an at least one primary key slot;
 an at least one primary key protrusion;
 a retractable pull pin;
 the drop-elbow coupler comprises a female outlet end and a male inlet end;
 the primary key slot being positioned adjacent to the female outlet end;
 the primary key slot laterally traversing into the drop-elbow coupler from an internal surface of the drop-elbow coupler;
 the primary key slot traversing into the drop-elbow coupler from an outlet rim of the drop-elbow coupler;
 the primary key protrusion being externally positioned to the storage-tank inlet tube;
 the primary key protrusion being laterally connected to the storage-tank inlet tube;
 the storage-tank inlet tube being positioned coincident and within the female outlet end;
 the primary key protrusion being positioned within the primary key slot;
 the retractable pull pin being positioned offset from the female outlet end, along the drop-elbow coupler;
 the retractable pull pin being laterally integrated into the drop-elbow coupler;
 a hose;
 a gravity-drop tube fitting;
 an at least one secondary key slot;
 an at least one secondary key protrusion;
 the hose comprises a tubular body, a first female coupler tube, and a second female coupler tube;
 the first female coupler tube being terminally connected to the tubular body;
 the second female coupler tube being terminally connected to the tubular body, opposite the first female coupler tube;
 the secondary key protrusion being positioned external and adjacent to the gravity-drop tube fitting;
 the secondary key protrusion being laterally connected to the gravity-drop tube fitting, adjacent to an outlet rim of the gravity-drop tube fitting;
 the secondary key slot laterally traversing into the first female coupler tube from an internal surface of the first female coupler tube;
 the secondary key slot traversing into an inlet rim of the first female coupler tube, opposite the tubular body;
 the gravity-drop tube fitting being positioned offset to the drop-elbow coupler;
 the gravity-drop tube fitting being positioned within the first female coupler tube;
 the secondary key protrusion being positioned within the secondary key slot; and
 the male inlet end being positioned within the second female coupler tube.

2. The diesel fuel cross-drop prevention kit as claimed in claim 1, wherein the gravity-drop tube fitting, the hose, the drop-elbow coupler, and the storage-tank inlet tube are in fluid communication with each other.

3. The diesel fuel cross-drop prevention kit as claimed in claim 1 comprising:
 a sealing annular cavity;
 the sealing annular cavity being coincidentally positioned with the storage-tank inlet tube;
 the sealing annular cavity being positioned offset to an inlet rim of the storage-tank inlet tube;
 the sealing annular cavity laterally traversing into the storage-tank inlet tube,
 the primary key protrusion being positioned adjacent to the sealing annular cavity, opposite the inlet rim of the storage-tank inlet tube; and
 the sealing annular cavity being positioned within the female outlet end.

4. The diesel fuel cross-drop prevention kit as claimed in claim 1, wherein a cross-section of the primary key slot and a cross-section of the primary key protrusion are each a rectangular profile.

5. The diesel fuel cross-drop prevention kit as claimed in claim 1, wherein the primary key slot laterally traverses through the drop-elbow coupler.

6. The diesel fuel cross-drop prevention kit as claimed in claim 1, wherein the hose, the gravity-drop tube fitting, the drop-elbow coupler, and the storage-tank inlet tube are each externally colored green.

7. The diesel fuel cross-drop prevention kit as claimed in claim 1 comprising:
 the at least one primary key slot comprises a plurality of primary key slots;

the at least one primary key protrusion comprises a plurality of primary key protrusions;

the plurality of primary key slots being radially distributed about the drop-elbow coupler;

the plurality of primary key protrusions being radially distributed about the storage-tank inlet tube; and each within the plurality of primary key protrusions being positioned within a corresponding slot from the plurality of primary key slots.

\* \* \* \* \*